United States Patent Office 3,432,312
Patented Mar. 11, 1969

3,432,312
REFRACTORY MOLD COMPOSITION
AND METHOD
Roy C. Feagin, Mountain Lakes, N.J., and Edward L. Dahowski, Oaklawn, and Peter Kosmos, Alsip, Ill., and Ronald R. Robb, Dover, N.J., assignors to Howmet Corporation, a corporation of Delaware
No Drawing. Filed Sept. 8, 1965, Ser. No. 485,928
U.S. Cl. 106—38.3    18 Claims
Int. Cl. C04b 31/30; B28b 7/34

ABSTRACT OF THE DISCLOSURE

A foundry mold having exceptionally high green strength is prepared from a molding composition containing (a) 15 to 50% by weight of a binder comprising a hydrolyzed methyl trialkoxy silane and water, (b) 0.001% to 0.5% by weight of a gelling agent and (c) the balance essentially is a fine refractory aggregate. The methyl trialkoxy silane has 4 to 10 carbon atoms, i.e., methyl trimethoxy silane, methyl triethoxy silane and methyl triisopropoxy silane. The suitable gelling agents include: triethanolamine, piperidene, pyridine, aminoquinone, hexamine, MgO, CaO, BaO, SrO, CoO, PbO, ZnO, CdO, $Na_2CO_3$, $CaCO_3$, $H_2SO_4$, $HNO_3$, HCl, HF, $H_3PO_4$, $NH_4F$, $Na_2SiF_6$, NaF, $BaCl_2$, $CoCl_2$, $PbCl_2$ and $NH_4Cl$.

This invention relates to the preparation of foundry molds and cores for precision castings, and in particular it relates to a new refractory composition for making molds and cores that have high green strength and that may have relatively thin sections.

Precision metal castings which require little if any machining to obtain a finished product or which must be formed within extremely small dimensional tolerances in the as-cast condition are commonly produced by the investment or "lost wax" casting process. In this process a pattern of the object to be cast is prepared from wax or some other readily meltable or destructible material, and the wax pattern is inserted or surrounded with a refractory mold composition comprising essentially a refractory aggregate and a liquid binder. After investment of the pattern the mold composition is dried, and the green or uncured mold is then heated to melt the wax which in the usual case escapes from the mold cavity through the riser passageway. The green or uncured mold usually is then baked or calcined to cure and strengthen the refractory composition and thus prepare the mold for the metal casting step of the process.

Both the green (the dried but uncured) and cured mold must have sufficient strength to be handled in the normal course of the drying, dewaxing and casting operations without being damaged or broken. In particular, the preparation of investment casting molds and cores having adequate green strength is of paramount importance when the molds and cores have portions or cross sections that are relatively thin (referred to herein as thin section molds and cores) such as shell molds, fine cores, dental models and the like. Moreover, it is of paramount importance in the preparation of all types of investment molds that the strength of the dried, dewaxed and cured mold (or core) be sufficient to withstand the stresses and high temperatures encountered in subsequent metal casting operations. As a result, considerable time and effort have been devoted to the development of refractory compositions for precision molds and cores which have high green strength so that molds (or cores) having thin sections can be produced without excessive breakage thereof, and which when cured or fired have sufficient strength to withstand the stresses of the casting operation.

It has heretofore been proposed that certain organo silicates, and in particular tetraethyl orthosilicate, be employed as the binder for refractory mold compositions. The organo silicate hydrolyzes when mixed with water and an acidic or basic hydrolyzing agent, and the resulting hydrolyzed organo silicate-containing liquid makes an excellent binder for a refractory aggregate in investment castings. However, molds produced by the use of this composition do not have exceptionally high green strength, and as a result it is difficult to produce satisfactory molds and cores having thin sections. Moreover, molds made from the hydrolyzed organo silicate-containing refractory compositions of the prior art almost universally had to be fired at relatively high temperatures in order to develop sufficient strength for the subsequent casting operation.

We have now found that a superior refractory composition for making molds and cores having exceptionally high green strength can be prepared by the use of aqueous solutions of certain hydrolyzed methyl trialkoxy silanes as the liquid binder for conventional refractory aggregates, the liquid binder and the refractory aggregate being thoroughly mixed together in certain specific proportions to obtain a refractory composition in the form of a pourable slurry. The high green strength of our new refractory composition is due in part to the specific particle size distribution of the refractory aggregate employed in the composition and in part to the relative proportions of all of the various constituents present in the composition. However, its high green strength is principally a result of our discovery and exploitation of the fact that the organo silances employed in our refractory composition pass through two closely related but nonetheless distinct phases or steps in the course of the setting or hardening of the composition. That is, we have found that when the methyl trialkoxy silanes employed in our composition are mixed with or dissolved in an adequate quantity of water the organo silane first hydrolyzes to form methyl silanetriol (and an alcohol corresponding to the alkoxy group of the original silane), and then the methyl silanetriol gells apparently as a result of the chemical condensation and polymerization of this substance. We have further found that, despite the close relationship between the hydrolyzing and the gelling of the organo silane, the two steps can be carried out essentially separately and at different times so that the liquid binder component of the refractory composition can be prepared, and the hydrolysis of the organo silane constituent of the binder substantially completely carried out, well in advance of the admixture of the liquid binder with the refractory aggregate component of the composition. Moreover, we have found that by the addition of certain gelling agents to the refractory composition, the hydrolyzed organo silane constituent of the liquid binder can be made to gell at a predetermined time following the investment of a mold pattern so that precise control and great flexibility is obtained in connection with mold and core making operations. However, the most important benefit that is derived from our discovery is the exceptionally high green strength of the molds and cores produced by the use of our new refractory composition.

The refractory mold and core composition of our invention comprises a homogeneous slurry containing from about 15 to 50% by weight of a liquid binder, from about 0.001 to 0.5% by weight of a gelling agent for hydrolyzed organo silanes and the balance essentially a refractory aggregate having a particle size distribution such that not more than about 70%, and preferably not more than about 50% by weight of the aggregate has a particle size of more than 100 mesh (Tyler Standard), and at least about 20%, and preferably at least about 35% by weight of the aggregate has a particle size or less than 200 mesh (Tyler Standard). The liquid binder contains between about 30 to 60% by weight of at least one hydrolyzed methyl trialkoxy silane in which each alkoxy group contains 1, 2 or 3 carbon atoms, and from about 70 to 40% by weight of water. The binder can also contain up to 30% by weight of tetraethyl orthosilicate provided it contains not less than 40% by weight of water, and it advantageously contains up to 0.1% by weight of any of the conventional acidic or basic hydrolyzing agents for organo silanes such as those hereinafter described. The refractory solids of the composition of our invention are held in suspension by the hydroyzed organo silanes of the liquid binder, and the resulting slurry can be poured about a wax pattern or the pattern can be dipped thereinto to produce molds and cores having exceptionally high green strength and a high modulus of rupture. The refractory composition will harden or set after being poured about the pattern without appreciable settling or particle segregation of the refractory solids content of the composition, and remarkably little shrinkage of the mold or core takes place as the refractory composition dries. The hardening or setting of the refractory composition is promoted by the presence therein of a gelling agent for hydrolyzed methyl trialkoxy silanes of the type hereinafter described, the gelling agent advantageously being admixed with refractory aggregate prior to the addition of the liquid binder thereto. Moreover, after being dried and dewaxed, molds prepared from the refractory composition of our invention ordinarily can be employed in the subsequent metal casting operation of the process without subjecting the mold to any treatment other than a high temperature curing or firing operation. Other advantages of our new refractory mold composition will become apparent in the following more detailed description thereof.

The refractory composition of our invention is prepared by forming a homogeneous mixture of the specified quantity of a liquid binder containing at least one of the specified, and advantageously substantially completely hydrolyzed, organo silanes with a specified quantity of a refractory aggregate having the specified particle size distribution, and with one of the herein described gelling agents for the hydrolyzed organo silanes. The green strength of the refractory composition is due in part to the silica content of the liquid binder constituent of the composition, and to insure that molds and cores produced in accordance with our invention have the high green strength that is characteristic of our new refractory composition we have found that the liquid binder advantageously should contain at least about 30% by weight of methyl trimethoxy silane, methyl triethoxy silane or methyl triisopropoxy silane, or a combination of these three organo silanes, so that the binder will contain at least 5%, and preferably at least 10%, by weight of siilca. Moreover, the liquid binder can also contain up to 30% by weight of tetraethyl orthosilicate, if desired, without sacrificing to any appreciable extent the high green strength of molds and cores formed from our refractory composition provided, of course, the binder contains the quantities of methyl trialkoxy silanes previously referred to. The organo silane is dissolved in a quantity of water in excess of that required to insure that the silane will be completely hydrolyzed, and we have found that for best results the liquid binder should contain not less than 40% by weight of water, which quantity of water is appreciably in excess of that required to insure complete hydrolysis of the silane. To promote the desired hydrolysis of the organo silane, the liquid binder also advantageously contains a very small amount of a conventional acidic or basic hydrolyzing agent for organo silanes, for example, quinonamine or piperidene or a heavy metal or alkaline earth metal oxide or salt, and preferably it contains between about 0.01 and 0.1% by weight of an acidic hydrolyzing agent such as HCl, $H_2SO_4$, $HNO_3$, $H_3PO_4$, HF and the like which have little tendency to cause gelation of the hydrolyzed organo silane. Gelation of the organo silane-containing liquid binder is inhibited by the use of very small quantities of the hydrolyzing agents, and it is also advantageously inhibited by chilling the binder to a temperature of about 40° F. or less during storage of the binder prior to admixing it with a refractory aggregate to form the refractory composition of our invention.

The foregoing considerations require that the liquid binder contain from about 30 to 60% by weight of at least one methyl trialkoxy silane in which each alkoxy group contains from 1 to 3 carbon atoms (for example, methyl trimethoxy silane or methyl triethoxy silane or methyl triisopropoxy silane or a combination of these three silanes), optionally up to about 30% by weight of tetraethyl orthosilicate, from about 40 to 70% by weight of water, and advantageously between about 0.01 and 0.1% by weight of a hydrolyzing agent for the organo silane. By way of example, liquid binders having the various compositions indicated in the following table have been successfully used in the practice of our invention.

| Constituent | Parts by weight of each constituent in each composition | | | | | | | | |
| --- | --- | --- | --- | --- | --- | --- | --- | --- | --- |
|  | 1 | 2 | 3 | 4 | 5 | 6 | 7 | 8 | 9 |
| Methyl trimethoxysilane | 30 | 60 |  |  |  |  | 30 |  | 30 | 50 |
| Methyl triethoxysilane |  |  | 30 | 60 |  |  | 40 | 10 |  |
| Methyl triisopropoxysilane |  |  |  |  | 50 |  |  |  | 10 |
| Tetraethyl orthosilicate |  |  |  |  |  | 20 | 10 | 10 |  |
| Water | 70 | 40 | 70 | 40 | 50 | 50 | 50 | 50 | 40 |

The refractory aggregate constituent of our new composition comprises a mixture of conventional refractory substances having the particle size distribution specified herein. For example, the refractory aggregate may comprise a mixture of finely divided silica, silica flour, ground glass, fireclay grog, zirconium silicate, calcined gyanite, banding sand, or any other refractory material which is inactive with respect to the metal to be cast and which has a melting point above the casting temperature of that metal. In order to produce molds and cores that have the high green strength that is characteristic of our new refractory composition, we have found it to be of critical importance that the particle size distribution of the refractory aggregate be such that not more than about 70%, and preferably not more than about 50%, by weight of the aggregate have a particle size of more than 100 mesh, and at least about 20%, and prefeably at least about 35%, by weight of the aggregate have a particle size of less than 200 mesh (Tyler Standard). If the finished casting is to have a smooth, non-grainy surface, the refractory aggregate preferably comprises refractory material substantially all of which has a particle size of less tan 200, and preferably less than 325 mesh (Tyler Standard). On the other hand, if the surface smoothness of the finished casting is of secondary importance, the refractory aggregate can contain a relatively large proportion of relatively coarse (that is, in the order of about −20 to +100 mesh) material, provided the over-all particle size distribution falls within the limits hereinbefore specified. In general, the greater the proportion of coarse material in the refractroy aggregate, the smaller the quantity of liquid binder that will be required to obtain molds and cores of optimum green strength.

The gelling agent constituent of our new refractory composition can be added directly to the liquid binder, in which case the liquid binder must be admixed with the refractory aggregate and the resulting refractory composition must be used to make a mold or core without undue delay. However, in order to prolong the shelf life of the liquid binder and to prevent premature gelation of the binder or the refractory composition to which the binder is added, the gelling agent is preferably added to the refractory aggregate (particularly if the gelling agent is a solid material) or to the mixture of liquid binder and refractory aggregate when these two constiutents of the composition are being mixed together. The gelling agent may comprise an organic or inorganic acidic or basic reagent, or it may be one of the heavy metal, alkali metal or alkaline earth metal oxides or salts which we have found to be effective for this purpose, and the quantity of gelling agent present in the composition can range from about 0.001 to about 0.5% by weight of the composition, depending on the agent employed and the speed of gelation desired. By way of example, we have found the following materials to be particularly satisfactory when employed as gelling agents in the practice of our invention: triethanolamine, piperidene, pyridine, aminoquinone, hexamine, MgO, CaO, BaO, SrO, CoO, PbO, ZnO, CdO, $Na_2CO_3$, $CaCO_3$, $H_2SO_4$, $HNO_3$, $HClHFH_3PO_4$, $NH_4F$, $Na_2SiF_6$, NaF, $BaCl_2$, $CoCl_2$, $PbCl_2$, $NH_4Cl$, and the like. In a series of tests of gelling speed involving most of the gelling agents listed, 25 gram samples of a solution containing 40% by weight of hydrolyzed methyl triethoxy silane and 60% by weight of water were treated with 0.06 gm. portions of each of the gelling agents involved in the test. Gel times ranged from 5 minutes to 48 hours, depending on the gelling agent employed. Accordingly, it will be appreciated that by the use of the appropriate gelling agent the refractory composition can be made to set or gel at almost any predetermined time after the addition of the gelling agent thereto.

The hydrolyzed liquid binder, refractory aggregate and gelling agent are intimately mixed together to form a homogeneous slurry which can be used in the usual manner to produce investment castings either by pouring the slurry about the pattern or by dipping the pattern into the slurry to form a shell mold. The mold composition should contain sufficient liquid binder so that a pourable slurry will be obtained, but it should not contain so much liquid binder that the mold produced therefrom will contain insufficient refractory material to withstand the stresses and high temperatures encountered in the subsequent casting operation. Accordingly, we have found that the composition of our invention should contain at least about 15% but not more than about 50% by weight of liquid binder, the balance (apart from the minor quantities of hydrolyzing and gelling agents present in the composition) being the refractory aggregate.

As noted, in the usual investment or lost wax casting procedure, the wax pattern is invested with the refractory composition by pouring the composition about the pattern or dipping the pattern in the composition, or the like. After the pattern has been invested with the refractory mold composition in the usual manner, and after the refractory composition has set or hardened as a result of gelation of the hydrolyzed product of the organo silane constituent of the liquid binder, the mold is dried to eliminate substantially all of the free moisture therefrom, preferably by heating the mold for several hours at a temperature near or slightly above the boiling point of water. The green mold is then heated to melt the wax pattern which escapes from the mold through the riser passageway in the usual manner. The dried and dewaxed mold is then usually subjected to a high temperature mold curing or firing operation as in the prior art to prepare the mold for the casting step of the process (in which step molten metal is poured into the mold cavity through the riser passageway). The mold prepared from our refractory composition possesses exceptionally high green strength and superior cured or fired strength as compared with an equivalent mold made from mold compositions known to the prior art, and as a consequence the refractory composition of our invention constitutes a significant advance in the art of producing shell molds, fine cores, dental models, and the like.

The following examples are illustrative but not limitative of the practice of our invention.

EXAMPLE I

A refractory mold composition was prepared in accordance with our invention by first preparing a liquid binder comprising 30% by weight of methyl trimethoxy silane and 70% by weight water containing about 0.1% HCl. After thorough mixing of the solution to effect substantially complete hydrolysis of the organo silane constituent thereof, 35 ml. of the hydrolyzed liquid binder were intimately mixed with 150 grams of a refractory aggregate comprising 26.98% by weight of 90 mesh silica, 38.0% by weight of a fireclay grog having a particle size ranging from −20 to +100 mesh, 35.0% by weight of −200 mesh silica flour and 0.02% by weight magnesium oxide. The formulation of the refractory mold composition, and the particle size distribution of the refractory aggregate, may be summarized as follows:

Liquid binder

| | Percent by wt. |
|---|---|
| Methyl trimethoxy silane | 30 |
| Water | 70 |
| HCl (hydrolyzing agent) | <0.1 |

Refractory aggregate

| | Percent by wt. |
|---|---|
| Silica, mesh: | |
| +60 | 0–0.67 |
| +80 | 0.27–1.04 |
| +100 | 0.54–1.34 |
| +140 | 1.62–2.96 |
| +200 | 1.89–3.23 |
| +230 | 54.0–56.5 |
| Fireclay grog, mesh: | |
| +20 | 1.52–3.43 |
| +40 | 16.0–25.0 |
| +60 | 12.4–14.4 |
| +80 | 1.52–3.8 |
| +100 | 0.38–0.95 |
| +140 | 0.38–1.52 |
| MgO (gelling agent) | 0.02 |

Refractory composition

| | | |
|---|---|---|
| Liquid binder | ml | 34 |
| Aggregate | gm | 150 |

The refractory composition was a pourable slurry that was used as an investment for a wax pattern for the cutting edge of a plastic tooth. After drying the investment at 220° F. for 4 hours, the mold was heated to melt and eliminate the wax pattern, and a cobalt base alloy was then poured into the mold cavity to obtain a completely satisfactory casting.

EXAMPLE II

A refractory mold composition employing the same refractory aggregate and having the following formulation was prepared as in Example I:

Liquid binder

| | Percent by wt. |
|---|---|
| Methyl trimethoxy silane | 60 |
| Water | 40 |
| HCl (hydrolyzing agent) | <0.1 |

Refractory aggregate

See Example I.

Refractory composition

| | | |
|---|---|---|
| Liquid binder | ml | 35 |
| Aggregate | gm | 150 |

The refractory mold composition was employed in an investment casting operation as in Example I, and a completely satisfactory cobalt base dental casting was obtained.

EXAMPLE III

A refractory mold composition was prepared by intimately mixing 35 ml. of a liquid binder comprising 30% by weight of hydrolyzed methyl trimethoxy silane and 70% by weight water with 150 grams of a refractory aggregate comprising 43.34% by weight of 80 mesh silica, 15.0% by weight of 90 mesh silica, 40.0% by weight of 300 mesh silica, 1.5% by weight of finely ground glass and 0.15% by weight magnesium oxide. The formulation of the refractory mold composition, and the particle size distribution of the refractory aggregate constituent thereof, were as follows:

Liquid binder

| | Percent by wt. |
|---|---|
| Methyl trimethoxy silane | 30 |
| Water | 70 |
| HCl (hydrolying agent) | <0.1 |

Refractory aggregate

| Silica, mesh | Percent by wt. |
|---|---|
| +60 | 4.4–12.0 |
| +100 | 7.0–16.6 |
| +200 | 7.2–17.4 |
| −600 | 53.7–65.0 |
| Finely ground glass | 1.50 |
| MgO (gelling agent) | 0.15 |

Refractory composition

| | | |
|---|---|---|
| Liquid binder | ml | 35 |
| Aggregate | gm | 150 |

The refractory composition was poured around a dental pattern as before. After the composition had hardened by the evaporation of water therefrom the green mold was placed in a furnace to burn out the wax and preheat the mold. A cobalt-chromium dental alloy was then poured into the hot, dewaxed mold to obtain a dental casting completely satisfactory as to dimensions and smoothness.

A second refractory mold composition was prepared by substituting methyl triethoxy silane for the methyl trimethoxy silane of the previous composition, and equally good results were obtained when the second composition was employed to produce a dental casting in the manner just described.

EXAMPLE IV

A refractory mold composition employing the same refractory aggregate and having the following formulation was prepared as in Example III:

Liquid binder

| | Percent by wt. |
|---|---|
| Methyl trimethoxy silane | 60 |
| Water | 40 |

Refractory aggregate

See Example III.

Refractory Composition

| | | |
|---|---|---|
| Liquid binder | ml | 35 |
| Aggregate | gm | 150 |

The refractory composition was employed to produce a dental casting as described in Example III with excellent results. Upon substituting methyl triethoxy silane for the methyl trimethoxy silane in the composition equally good results were obtained.

EXAMPLE V

A refractory mold composition having the following formulation, and employing a refractory aggregate having the particle size distribution indicated, was prepared as before:

Liquid binder

| | Percent by wt. |
|---|---|
| Methyl trimethoxy silane | 30 |
| Water | 70 |
| HCl (hydrolyzing agent) | <0.1 |

Refractory aggregate

| Silica, mesh: | Percent by wt. |
|---|---|
| +40 | 2.4–3.6 |
| +60 | 16.4–21.0 |
| +80 | 22.4–28.9 |
| +100 | 9.0–15.9 |
| +140 | 10.5–16.0 |
| +200 | 3.4–5.8 |
| −200 | 20.7–33.8 |
| Ground soda lime glass | 1.0 |
| MgO (gelling agent) | 0.16 |

Refractory composition

| | | |
|---|---|---|
| Liquid binder | ml | 35 |
| Aggregate | gm | 150 |

This refractory composition was used in a dental investment casting operation to produce an entirely satisfactory casting. Similar results were obtained when methyl triethoxy silane was substituted for the methyl trimethoxy silane in the composition.

EXAMPLE VI

A refractory mold composition employing the same refractory aggregate as in Example V and having the following formulation was prepared as before:

Liquid binder

| | Percent by wt. |
|---|---|
| Methyl trimethoxy silane | 60 |
| Water | 40 |
| HCl (hydrolyzing agent) | <0.1 |

Refractory aggregate

See Example V.

Refractory composition

| | Percent by wt. | |
|---|---|---|
| Liquid binder | ml | 35 |
| Aggregate | gm | 150 |

This refractory composition was used in a dental investment casting operation to produce an entirely satisfactory casting. Similar results were obtained when methyl triethoxy silane was substituted for the methyl trimethoxy silane in the composition.

Example VII

A refractory aggregate having the desired particle size distribution was prepared by mixing 2550 gm. of 325 mesh milled zircon, 1700 gm. of 325 mesh fused silica, 7650 gm. of 200 x 400 mesh fused silica, 5100 gm. of −100 mesh fused silica and 51 gm. of calcined magnesium oxide, the mixture being milled for 16 hours in a twin cone blender to insure thorough blending of the constituents of the aggregate. A liquid binder was prepared by mixing 107 gm. of methyl trimethoxy silane with 193 gm. of distilled water, the mixture being vigorously stirred for 20 to 30 minutes to hydrolyze the organo silane. The organo silane contained sufficient residual hydrocloric acid (about 0.1% HCl) to insure substantially complete hydrolysis of this substance before completion of the stirring operation. The liquid binder was cooled to a temperature of between 37° to 41° F. to inhibit gelation of the hydrolyzed organo silane constituent thereof, and the cool liquid binder was stored until needed to make up the refractory composition of our invention. The refractory composition was prepared by mixing 132 gm. of the liquid binder with 275 gm. of the refractory aggregate, the thoroughly blended composition being maintained at the aforementioned temperature to inhibit gelation of the hydrolyzed organo silane. The formulation of the refractory mold comopsition, and the particle size distribution of the refractory aggregate constituent thereof, may be summarized as follows:

Liquid binder

| | Percent by wt. |
|---|---|
| Methyl trimethoxy silane | 35.7 |
| Water | 64.3 |
| HCl (hydrolyzing agent) | <0.1 |

Refractory aggregate

| Silica, mesh: | Percent by wt. |
|---|---|
| +100 | 0–0.28 |
| +200 | 10.08–12.32 |
| +270 | 10.34–12.62 |
| +375 | 8.08–9.88 |
| +400 | 2.54–4.33 |
| −400 | 43.63–53.45 |
| Zircon, mesh: | |
| +270 | 0–0.07 |
| +325 | 0–0.07 |
| +400 | 0.15–0.89 |
| +400 | 13.8–14.8 |
| MgO (gelling agent) | 0.29 |

Refractory composition

| | gm. |
|---|---|
| Liquid binder | 132 |
| Aggregate | 275 |

The refractory composition was employed to make thin section cores having exceptionally high green strength in the manner herein described.

EXAMPLE VIII

A refractory composition employing the same liquid binder but a different refractory aggregate was prepared as described in Example VII. The particle size distribution of the aggregate was as follows:

Refractory aggregate

| | Percent by wt. |
|---|---|
| Fireclay grog, mesh: | |
| −2 +6 | 20.0 |
| Calcined kanite, mesh: | |
| +40 | 0.16 |
| +70 | 0.16 |
| +100 | 0.08 |
| +150 | 0.72 |
| +200 | 6.56 |
| −200 | 72.32 |

This refractory composition was used as a backing investment for coated wax patterns.

EXAMPLE IX

A series of tests were made to determine both the green strength and the strength of the cured composition (as determined by the modulus of rupture of identical test specimens) of refractory compositions containing equivalent amounts of methyl trimethoxy silane and tetraethyl orthosilicate in the respective liquid binders. Four refractory compositions were prepared by mixing equal portions of the refractory aggregate of Example V first with a liquid binder containing 12.2% $SiO_2$ in the form of hydrolyzed methyl trimethoxy silane, second with a liquid binder containing 12.2% $SiO_2$ in the form of hydrolyzed tetraethyl orthosilicate, third with a liquid binder containing 20% $SiO_2$ in the form of methyl trimethoxy silane, and fourth with a liquid binder containing 20% $SiO_2$ in the form of tetraethyl orthosilicate. A number of test specimens were prepared from each of the four refractory compositions, and all specimens were dried for four hours at 220° F. The green strength of a specimen of each of the four compositions was determined by measurement of the modulus of rupture of the specimen. The remaining specimens of all four compositions were then fired for 4 hours at a temperature of 2100° F. and the strength of these cured specimens, as measured by the modulus of rupture, was determined. The results of these tests are set forth in the following table:

| | Modulus of rupture, p.s.i. | |
|---|---|---|
| | Green strength | Fired strength |
| Composition made from liquid binder containing 12.2% $SiO_2$ as— | | |
| Methyl trimethoxy silane | 46.6 | 101 |
| Tetraethyl orthosilicate | 15.5 | 78 |
| Composition made from liquid binder containing 20.0% $SiO_2$ as— | | |
| Methyl trimethoxy silane | 469 | 278 |
| Tetraethyl orthosilicate | 53 | 111 |

These modulus of rupture tests show conclusively the markedly superior green strength and cured strength of our new refractory composition as compared with the green and cured strength of the prior art composition containing an equivalent amount of $SiO_2$.

EXAMPLE X

A refractory aggregate comprising predominantly −325 mesh fine ground fused silica and a liquid binder prepared from water and methyl trimethoxy silane and having a $SiO_2$ content of 20%, together with a trace of MgO gelling agent, were blended together to form a refractory mold composition in accordance with my invention that would be suitable for the production of very fine cored passages and dipcoat investment molds. The same refractory aggregate was mixed with a liquid binder prepared from water and tetraethyl orthosilicate having the same $SiO_2$ content to obtain a second refractory mold composition. Test specimens of each refractory mold composition were dried for 4 hours at 220.° F. The specimen prepared from the liquid binder containing methyl trimethoxy silane experienced a shrinkage of 0.46% during the drying operation, and the green strength of the composition, as measured by the modulus of rupture of this specimen, was 693 p.s.i. The specimen prepared from the liquid binder containing tetraethyl orthosilicate experienced a shrinkage of 0.88% on drying and had a modulus of rupture of 209 p.s.i. Similar tests were conducted with methyl triethoxy silane as the binder material and equally impressive results were noted.

EXAMPLE XI

A refractory mold composition prepared from −325 mesh fused silica and a methyl trimethoxy silane base liquid binder containing 20% $SiO_2$ and less than 0.1% HCl as a hydrolyzing agent was employed to prepare a dipcoat shell mold about a wax pattern by repeated dipping of the pattern into the refractory composition slurry and, upon withdrawing the pattern from the slurry after each dip, dusting each layer of the adhering refractory composition with coarse fused silica. The resulting shell mold was dried, dewaxed and cast in a cobalt base alloy to produce a precision dental casting having a smooth surface.

From the foregoing description of our new high green strength refractory mold composition it will be seen that we have made an important contribution to the art to which our invention relates.

We claim:
1. Refractory mold and core composition having high green strength and adapted to make molds and cores having thin sections which comprises
    a homogeneous pourable slurry comprising from about 15 to 50% by weight of a liquid binder containing at least one hydrolyzed methyl trialkoxy silane having from 4 to 10 carbon atoms, from about 0.001 and 0.5% by weight of a gelling agent for said organo silanes, and the balance essentially a refractory aggregate having a particle size distribution such that not more than about 70% by weight of the aggregate has a particle size larger than 100 mesh and at least about 20% by weight has a particle size smaller than 200 mesh (Tyler Standard).

2. Refractory mold and core composition having high green strength and adapted to make molds and cores having thin sections which comprises a homogeneous pourable slurry comprising from about 15 to 50% by weight of a liquid binder containing at least one methyl trialkoxy silane, from about 0.001 and 0.5% by weight of a gelling agent for said organo silanes, and the balance essentially a refractory aggregate having a particle size distribution such that not more than about 70% by weight of the aggregate has a particle size larger than 100 mesh and at least about 20% by weight has a particle size smaller than 200 mesh (Tyler Standard), the liquid binder comprising initially from about 30 to 60% by weight of at least one methyl trialkoxy silane selected from the group consisting of methyl trimethoxy silane, and methyl triethoxy silane, and methyl triisopropoxy silane, and the balance essentially water, said organo silane constituent of the liquid binder being substantially completely hydrolyzed prior to the admixture of the refractory aggregate and gelling agent therewith.

3. The refractory composition according to claim 2 in which not more than about 50% by weight of the refractory aggregate has a particle size of larger than 100 mesh (Tyler Standard).

4. The refractory composition according to claim 2 in which at least aobut 35% by weight of the refractory aggregate has a particle size of smaller than 200 mesh (Tyler Standard).

5. The refractory composition according to claim 2 in which the particle size of the refractory aggregate is predominately −325 mesh (Tyler Standard).

6. The refractory composition according to claim 2 in which the liquid binder contains not less than about 5% by weight silica.

7. The refractory composition according to claim 2 in which the gelling agent is selected from the group consisting of triethanolamine, piperidene, pyridine, aminoquinone, hexamine, MgO, CaO, BaO, SrO, CoO, PbO, ZnO, CdO, $Na_2CO_3$, $CaCO_3$, $H_2SO_4$, $HNO_3$, HCl, HF, $H_3PO_4$, $NH_4F$, NaF, $Na_2SiF_6$, $BaCl_2$, $CoCl_2$, $PbCl_2$ and $NH_4Cl$.

8. The refractory composition according to claim 2 in which the liquid binder contains up to about 30% by weight of tetraethyl orthosilicate and not less than about 40% by weight of water.

9. The refractory composition according to claim 2 in which the refractory aggregate has the following composition:

| Silica, mesh: | Percent by wt. |
| --- | --- |
| +60 | 0–0.67 |
| +80 | 0.27–1.04 |
| +100 | 0.54–1.34 |
| +140 | 1.62–2.96 |
| +200 | 1.89–3.23 |
| +230 | 54.0–56.5 |
| Fireclay grog, mesh: | |
| +20 | 1.52–3.43 |
| +40 | 16.0–25.0 |
| +60 | 12.4–14.4 |
| +80 | 1.52–3.8 |
| +100 | 0.38–0.95 |
| +140 | 0.38–1.52 |

10. The refractory composition according to claim 2 in which the refractory aggregate has the following composition:

| Silica, mesh: | Percent by wt. |
| --- | --- |
| +60 | 4.4–12.0 |
| +100 | 7.0–16.6 |
| +200 | 7.2–17.4 |
| −600 | 53.7–65.0 |
| Finely ground glass | 1.50 |

11. The refractory composition according to claim 2 in which the refractory aggregate has the following composition:

| Silica, mesh: | Percent by wt. |
| --- | --- |
| +40 | 2.4–3.6 |
| +60 | 16.4–21.0 |
| +80 | 22.4–28.9 |
| +100 | 9.0–15.9 |
| +140 | 10.5–16.0 |
| +200 | 3.4–5.8 |
| −200 | 20.7–33.8 |
| Ground soda lime glass | 1.0 |

12. The refractory composition according to claim 2 having the following composition:

Liquid binder

| | Percent by wt. |
| --- | --- |
| Methyl trimethoxy silane | 35.7 |
| Water | 64.3 |
| HCl (hydrolyzing agent) | <0.1 |

Refractory aggregate

| Silica, mesh: | Percent by wt. |
| --- | --- |
| +100 | 0–0.28 |
| +200 | 10.08–12.32 |
| +270 | 10.34–12.62 |
| +375 | 8.08–9.88 |
| +400 | 2.54–4.33 |
| −400 | 43.63–53.45 |
| Zircon, mesh: | |
| +270 | 0–0.07 |
| +325 | 0–0.29 |
| +400 | 0.15–0.89 |
| −400 | 13.8–14.8 |
| Gelling agent | 0.29 |

Refractory composition

| | gm. |
| --- | --- |
| Liquid binder | 132 |
| Aggregate | 275 |

13. The refractory composition according to claim 2 in which the refractory aggregate has the following composition:

| Fireclay grog, mesh: | Percent by wt. |
| --- | --- |
| 2+6 | 20.0 |
| Calcined kanite, mesh: | |
| +40 | 0.16 |
| +70 | 0.16 |
| +100 | 0.08 |
| +150 | 0.72 |
| +200 | 6.56 |
| −200 | 72.32 |

14. method for preparing a foundry mold which comprises:

mixing (a) 15% to 50% by weight of a binder comprising hydrolyzed methyl trialkoxy silane having 4 to 10 carbon atoms and water with (b) 0.001% to 0.5% by weight of a gelling agent and (c) a fine refractory aggregate to form a slurry, contacting the resultant slurry with a pattern to form a shell mold, allowing the mold to gel while it is in contact with the pattern, and thereafter drying said mold and removing the pattern therefrom.

15. A method according to claim 14 wherein the methyl trialkoxy silane is methyl trimethoxy silane, methyl triethoxysilane or methyl triisopropoxy silane.

16. A method according to claim 15 wherein the gelling agent is triethanolamine, piperidene, pyridine, aminoquinone, hexamine, MgO, CaO, BaO, SrO, CoO, PbO ZnO, CdO, $Na_2CO_3$ $CaCO_3$, $H_2SO_4$, $HNO_3$, HCl, HF, $H_3PO_4$ $NH_4F$, $Na_2SiF_6$, NaF, $BaCl_2$, $CoCl_2$, $PbCl_2$ or $NH_4Cl$.

17. A method according to claim 16 wherein the refractory aggregate has a particle size distribution such that not more than about 70% by weight of the aggregate has a particle size larger than 100 mesh and at least about 20% by weight has a particle size smaller than 200 mesh (Tyler Standard).

18. A method according to claim 17 wherein the binder contains 30 to 60% by weight of said hydrolyzed methyl trialkoxy silane and the balance is water.

References Cited

UNITED STATES PATENTS

| | | |
|---|---|---|
| 2,643,964 | 6/1953 | Smith-Johannsen _ _ 106—287 XR |
| 2,993,809 | 7/1961 | Bueche et al. _ _ _ _ 106—287 XR |
| 3,046,242 | 7/1962 | Santelli _ _ _ _ _ _ _ _ _ 106—287 XR |
| 3,093,494 | 6/1963 | Hedlund et al. _ _ _ _ _ _ _ 106—38.2 |
| 3,232,771 | 2/1966 | Pearce _ _ _ _ _ _ _ _ _ _ _ _ 106—38.35 |

JULIUS FROME, *Primary Examiner.*

L. HAYES, *Assistant Examiner.*

U.S. Cl. X.R.

106—38.35, 57, 68, 69, 287

UNITED STATES PATENT OFFICE
CERTIFICATE OF CORRECTION

Patent No. 3,432,312

March 11, 1969

Roy C. Feagin et al.

It is certified that error appears in the above identified patent and that said Letters Patent are hereby corrected as shown below:

Column 1, line 43, "inserted" should read -- invested --. Column 2, line 38, "silances" should read -- silanes --. Column 4, line 44, "gyanite" should read -- kyanite --; line 61, "tan" should read -- than --. Column 7, line 17, "hydrolying" should read -- hydrolyzing --. Column 8, lines 74 and 75, "comopsition" should read -- composition --. Column 9, line 18, "0-0.07" should r -- 0-0.29 --; line 20, "+400" should read -- -400 --; line 42, "kanite" should read -- kyanite --. Column 11, lines 24 and 25, "refactory" should read -- refractory --; line 28, "aobut" should read -- about --. Column 12, line 45, "2+6" should read -- -2+6 --; line 46, "kanite" should read -- kyanite --; lin 53, before "method" insert -- A --.

Signed and sealed this 31st day of March 1970.

(SEAL)
Attest:

Edward M. Fletcher, Jr.

Attesting Officer

WILLIAM E. SCHUYLER, JR.

Commissioner of Patents